UNITED STATES PATENT OFFICE.

EMIL E. NOVOTNY, OF LOGAN, PENNSYLVANIA, AND DONALD S. KENDALL, OF GLEN RIDGE, NEW JERSEY, ASSIGNORS TO JOHN STOGDELL STOKES, OF PHILADELPHIA, PENNSYLVANIA.

SYNTHETIC RESIN COMPOSITION.

1,398,146.   Specification of Letters Patent.   Patented Nov. 22, 1921.

No Drawing.   Application filed October 27, 1920.   Serial No. 419,937.

*To all whom it may concern:*

Be it known that we, EMIL E. NOVOTNY and DONALD S. KENDALL, citizens of the United States, and residents of Logan, Philadelphia county, Pennsylvania, and Glen Ridge, Essex county, New Jersey, respectively, have invented certain new and useful Improvements in Synthetic Resin Compositions of which the following is a specification.

This invention relates to plastics or compositions and to the process of making the same, and has particular application to the manufacture of synthetic resins in the nature of phenolic condensation products adapted especially for molding purposes, and which, when properly subjected to the action of heat or heat and pressure, will undergo chemical reaction and assume a hard, set and infusible form.

Heretofore in the manufacture of phenolic condensation materials it has been usual to produce the same by the combination of phenol and formaldehyde, either with or without a catalyst, acid or base. In some instances at the time of making the initial mixture, such a quantiy of formaldehyde is used, that when the resultant plastic is subjected to a predetermined degree of heat, or heat and pressure, as in molding an article, such plastic will assume an infusible form without the use of any additional hardening agent, the quantity of formaldehyde first incorporated in the mass being sufficient for this purpose. Another method of preparing such phenol-formaldehyde condensation products has been to initially mix with the phenol a relatively small quantity of formaldehyde, which of itself is insufficient to cause the product to assume an infusible form at the time of the final molding operation without the use of an additional hardening agent. Therefore, an additional hardening agent, such as formaldehyde or its derivatives, such as paraform or hexamethylene-tetramin, is added to the initial mixture of phenol and formaldehyde some time prior to the molding operation, but after the initial mixture of phenol and formaldehyde has undergone chemical combination to a degree to form what might be termed a fusible resin. In other words, one method heretofore employed has been to incorporate the hardening agent at the time of the initial formation of the plastic composition, while the other method has been to add the hardening agent after a fusible resin of phenol and formaldehyde has been made. But in every instance, so far as we are aware, formaldehyde or some one of its derivatives has been employed as the hardening agent in the manufacture of these phenolic condensation products.

We have discovered that a very superior phenolic condensation product, possessing manifest points of advantage over known phenol-formaldehyde condensation products, such as above mentioned, may be made by using, as one of the ingredients or elements, furfural—$C_4H_3O.CHO$— (furfuraldehyde), or as a substitute therefor or equivalent thereof, the furfural derivative known as furfuramid—$(C_5H_4O)3.N_2$.

Among the advantages incident to the use of furfural in our product, we might mention the following:—

Our furfural phenolic condensation product reacts with great speed, which is essential to the attainment of economic molding conditions. Furthermore, the molded article, without the addition of any dye, pigment or coloring matter, will present a deep, jet-black, highly polished, smooth and attractive appearance, which renders our material particularly desirable for molding of phonograph records, printing plates and other articles. The smooth, polished surface which results in an article molded with our material is particularly useful in the case of phonograph records, for the surface of the record made from our material is so hard, smooth and polished that the hissing or grinding noise commonly incident to the use of records now on the market is entirely eliminated, and consequently, full and clear tones will be produced. In addition, our condensation product is readily separable from metal, after the molding operation, and this is particularly advantageous where metal-faced matrices are used, inasmuch as the liability of the molded article sticking or clinging to the matrix is obviated and consequently, the danger of destroying the molded face of the article is avoided. Another advantage is that our phenolic condensation product, under heat reaction, will set to a hard, tenacious, infusible form, and with such speed that it can be removed from the mold or matrix while still in a heated condition, and without impairing the gloss, finish, or shape of the molded article.

In order to enable those skilled in the art to practice our invention in its various forms, we have herein below set forth certain specific examples in detail; and in connection with the present description we wish it to be understood that where we herein use the term "phenol", this is to be considered as including phenol, cresol, resorcinol, naphthol, and substances having similar characteristics, and where we have herein used the term "furfural", we wish this to be understood as embracing not only the substance known as furfural (furfuraldehyde), but also any furfural derivative which is useful for or adapted to our purpose and which may be employed as a substitute for or as the equivalent of furfural itself.

Example 1: We first make a fusible synthetic resin composed of a mixture of phenol, furfural, and an acid catalyst, such as hydrochloric acid. This fusible resin is subsequently treated with a hardening agent, so that in the molding operation, under the action of heat, or heat and pressure, the material will assume a hard, set and infusible form.

In making the fusible synthetic resin, the materials mentioned may be provided, for example, in the proportions, by weight, of 100 parts of phenol to 15 to 40 parts of furfural, and 5 to 10 parts of hydrochloric acid of about 39% strength. The phenol crystals are first melted and placed in a suitable acid and pressure resisting container, and we then add the furfural and the acid catalyst. Upon the mixture of the materials, the chemical reaction which takes place results in the generation of considerable heat and water, and it is therefore desirable to provide the container with a water-jacket to maintain the mass at a temperature of about 200° F. It is also desirable to thoroughly mix the ingredients and for this purpose the container may be provided with any suitable type of agitator. The mixture is kept in the container under agitation, for a period of about one hour, or for a sufficient length of time to allow for proper chemical reaction to combine all traces of the furfural. The container is then subjected to heat (as by drawing off the water from the jacket and passing steam through the latter), at a temperature of about 330° F. to boil off the hydrochloric acid and the water of condensation. Should any excess or uncombined phenol remain, this may be eliminated either by steam or vacuum distillation, as is well known in this art. If necessary, at this stage the resinous mass or mixture may be treated with an alkali or alkali carbonates to neutralize or remove any traces of the hydrochloric acid which might exist.

The resultant fusible gum is now removed from the container and is treated by mixing therewith a hardening agent, such as the furfural derivative, furfuramid, in any suitable proportion, say from 8 to 40% by weight of the mass or mixture being treated. For the hardening agent we may use furfural itself, but when so doing, it will be necessary to add a suitable catalyst, such as ammonia. The use of such a catalyst is not necessary where we employ the furfural derivative, furfuramid, as the latter itself liberates ammonia during reaction. The fusible resin, at the time of treatment with the hardening agent may be in the form of a powder, or a liquid solution, employing alcohol or acetone for the solvent.

The quantity of hardening agent added to the fusible resin may vary, as above indicated, and will depend, of course, upon the degree of hardness and infusibility desired in the molded article. After the hardening agent has been thoroughly mixed, or incorporated in the fusible gum, the composition is ready for use in molding operations, in that it is capable of being softened to a moldable condition by the application of heat, and then it is capable of assuming hard, set and infusible condition under the continued application of heat at a temperature of from 200 to 350° F., or by the application of such a degree of heat together with pressure.

Example 2: We provide a fusible synthetic resin by using the same materials and following the process recited for Example 1, but in place of subsequently employing furfural, or furfuramid, as the hardening agent, we use a methylene-containing substance, as hexa-methylene-tetramin, for this purpose, in the proportions of from 5 to 20% by weight of this hexa-methylene-tetramin to the weight of the mass treated. We have found by experience that the resultant molding plastic is particularly well adapted, and exceedingly satisfactory for molding articles requiring a fine detailed well polished surface.

Example 3: Instead of combining furfural with the phenol in the initial formation of the fusible synthetic resin, we make such fusible resin of phenol and formaldehyde, in the proportions by weight of 100 parts of phenol to 55 parts of formaldehyde, of a 37% strength formaldehyde. The fusible resin formed by the reaction of these substances may then be treated with furfural, or furfuramid as a hardening agent, used in the proportions of from 8 to 40% by weight to the weight of the mass being treated. This results in a high grade synthetic resin which will rapidly re-act to infusibility under the influence of a proper degree of heat.

Example 4: We provide a fusible synthetic resin by the action of an acetaldehyde or paraldehyde with phenol in the proportions by weight of 100 parts of phenol to 37 parts of the acetaldehyde or paraldehyde treated with a catalyst such as hydrochloric acid in the proportion of ½ of 1% by weight of the catalyst to the weight of the mixture of phenol and the acetaldehyde or paraldehyde being treated. The resultant fusible gum is treated with furfural or its derivative, furfuramid, as the hardening agent in the proportions by weight of from 15 to 40 parts of furfural or furfuramid to the weight of the mass of the fusible resin treated.

This also provides a plastic material which will embody the various advantages and possess the characteristics hereinbefore set forth.

In connection with our invention, and the various examples given, we wish it to be understood that we do not confine ourselves to all the precise proportions or to the details herein set forth by way of illustration, as modification and variation may be made as conditions may require, or as may be deemed desirable. For instance, in the process of making the fusible resins set forth in the foregoing examples, substantially the same general method or process may be used as to mixing, agitation, heat treatment and the like, although the degree of heat and the time required for treatment may be varied to suit particular conditions. For example, where the fusible gum contains phenol and formaldehyde, a higher temperature is used than would be resorted to in case the fusible resin contained phenol or furfural, a temperature of approximately 300° F. being preferable in treating the phenol-formaldehyde fusible gum. Of course, the amount of hardening agent employed and the length of time of heat treatment may be varied according to the degree of infusibility required, a low percentage of hardener being used, and a lesser degree of heat being applied where an article with little infusibility is to be molded, while a higher percentage of hardening agent and a greater degree of heat may be used where an article of great infusibility is desired.

Our material is prepared for the market in various forms, either as a liquid or varnish, by using a suitable solvent such as alcohol or acetone, and this liquid or varnish may have incorporated herewith a suitable fibrous filler such as corn-cob cellulose, which may be prepared by making a pulp from corncobs and grinding and drying the same. Such a filler possesses high absorption qualities and is particularly useful for our purpose. Our plastic material may also be prepared and marketed in sheet or powder form either with or without a filler material, such as corn-cob cellulose incorporated therein.

What we claim is—

1. A new composition of matter comprising a fusible condensation product of phenol and furfural.

2. A new composition of matter comprising a fusible condensation product resulting from the reaction of a phenolic body and furfural in the presence of a catalytic agent.

3. A new composition of matter comprising a fusible condensation product of phenol and furfural, and a hardening agent, said composition being convertible by heat into a hard, insoluble and infusible body.

4. A new composition of matter comprising a fusible condensation product resulting from the reaction of a phenolic body and furfural in the presence of a catalytic agent, and a hardening agent incorporated with the fusible condensation product, said composition being convertible by heat into a hard insoluble and infusible body.

5. A new composition of matter comprising a fusible condensation product resulting from the reaction of a phenolic body and furfural in the presence of an acid catalyst, and a hardening agent incorporated with said fusible condensation product, said composition being convertible by heat into a hard, insoluble and infusible body.

6. A potentially reactive composition, comprising a fusible condensation product of phenol and furfural and a hardening agent comprising a methylene containing body, said composition being convertible by heat into a hard, insoluble and infusible body.

7. A potentially reactive composition, comprising a fusible condensation product of phenol and furfural and a hardening agent comprising a hexa-methylene-tetramin, said composition being convertible by heat into a hard, insoluble and infusible body.

8. A potentially reactive composition, comprising a fusible condensation product resulting from the reaction of a phenolic body and furfural in the presence of hydrochloric acid as a catalyst, and a hardening agent for such product comprising hexa-methylene-tetramin, said composition being convertible by heat into a hard, insoluble and infusible body.

9. A composition comprising a fusible condensation product of phenol and furfural and a filler.

10. A potentially reactive molding mixture comprising a fusible condensation product of phenol and furfural, a reaction agent for causing the converting of the fusible product into a hard insoluble and infusible product under heat, and a filling material.

11. A potentially reactive molding mixture comprising a fusible condensation product of phenol and furfural, a reactive agent for causing the converting of the fusible product into a hard insoluble and infusible product under heat, and a filling material comprising corn-cob cellulose.

12. The herein described method which consists in mixing phenol, furfural and a condensing agent with the phenol in excess of the furfural, in such proportions as to yield, by reaction, upon the elimination of any excess phenol and water of condensation, a condensation product of the fusible, soluble type.

13. The method which consists in subjecting a fusible condensation product of phenol and furfural to the action of heat in the presence of a hardening agent to transform the fusible product into a hard, insoluble, infusible body.

14. The method which consists in reacting on a phenolic body with furfural in the presence of a condensing agent to form a fusible, soluble condensation product, and then hardening said product.

15. The method which consists in reacting on a phenolic body with furfural in the presence of a catalyst acting as a condensing agent, then subjecting said fusible body to the action of heat in the presence of a methylene containing a hardening agent to transform the fusible body into a hard insoluble, infusible body.

Signed at Philadelphia, in the county of Philadelphia and State of Pennsylvania, this 26th day of October, 1920.

EMIL E. NOVOTNY.
DONALD S. KENDALL.